United States Patent
Kano et al.

(10) Patent No.: US 12,041,027 B2
(45) Date of Patent: Jul. 16, 2024

(54) COMMUNICATION APPARATUS, COMMUNICATION SYSTEM, COMMUNICATION METHOD AND PROGRAM

(71) Applicant: Nippon Telegraph and Telephone Corporation, Tokyo (JP)

(72) Inventors: Hiroki Kano, Musashino (JP); Katsuma Miyamoto, Musashino (JP); Akihiro Kimura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 17/795,788

(22) PCT Filed: Feb. 5, 2020

(86) PCT No.: PCT/JP2020/004418
§ 371 (c)(1),
(2) Date: Jul. 27, 2022

(87) PCT Pub. No.: WO2021/156983
PCT Pub. Date: Aug. 12, 2021

(65) Prior Publication Data
US 2023/0087723 A1  Mar. 23, 2023

(51) Int. Cl.
*H04L 61/255* (2022.01)
*H04L 12/46* (2006.01)
*H04L 61/103* (2022.01)

(52) U.S. Cl.
CPC ........ *H04L 61/255* (2013.01); *H04L 12/4633* (2013.01); *H04L 61/103* (2013.01)

(58) Field of Classification Search
CPC .. H04L 61/255; H04L 12/4633; H04L 61/103
See application file for complete search history.

(56) References Cited

U.S. PATENT DOCUMENTS 8,284,782 B1 * 10/2012 Maufer ................. H04L 61/103
370/395.54
10,057,162 B1 * 8/2018 Singh ...................... H04L 69/22
(Continued)

FOREIGN PATENT DOCUMENTS

JP  2010141919  6/2010

OTHER PUBLICATIONS

Mahalingam et al., "Virtual extensible Local Area Network (VXLAN): A Framework for Overlaying Virtualized Layer 2 Networks over Layer 3 Networks," Independent Submission Request for Comments: 7348, Aug. 2014, retrieved from URL <https://tools.ietf.org/html/rfc7348>, 22 pages.

*Primary Examiner* — Joseph L Greene
(74) *Attorney, Agent, or Firm* — Fish & Richardson P.C.

(57) ABSTRACT

A communication apparatus which terminates an L2 tunnel and an L3 tunnel includes a table storage unit which stores an ARP table where a broadcast MAC address is set as a destination MAC address linked to a destination IP address, and a transmission unit which acquires the broadcast MAC address as a destination MAC address corresponding to a destination IP address of an IP packet received via the L3 tunnel by referring to the ARP table and transmits a frame to which the broadcast MAC address is added as a destination MAC address, via the L2 tunnel.

9 Claims, 12 Drawing Sheets

(56) References Cited

U.S. PATENT DOCUMENTS

| | | | |
|---|---|---|---|
| 10,257,152 B2* | 4/2019 | Wang | H04L 49/201 |
| 10,326,830 B1* | 6/2019 | Singh | H04L 41/12 |
| 11,070,471 B1* | 7/2021 | Chang | H04L 45/66 |
| 2008/0080512 A1* | 4/2008 | Gofman | H04L 45/00 370/392 |
| 2009/0106213 A1* | 4/2009 | Danforth | H04L 61/5014 |
| 2017/0104851 A1* | 4/2017 | Arangasamy | H04L 63/0428 |
| 2020/0036717 A1* | 1/2020 | Akella | H04L 12/4633 |
| 2020/0220838 A1* | 7/2020 | Ogawa | H04L 12/28 |
| 2021/0029087 A1* | 1/2021 | Uy | H04L 43/062 |

\* cited by examiner

| DESTINATION IP ADDRESS | DESTINATION MAC ADDRESS |
|---|---|
| 10.10.1.2 | ff-ff-ff-ff-ff-ff |

Fig. 4

| L2 TUNNEL HEADER | DESTINATION MAC | SOURCE MAC | 802.1Q | ORIGINAL ETHERNET(R) FRAME |
|---|---|---|---|---|
| | ff-ff-ff-ff-ff-ff | L2-2MAC | | |

| DESTINATION IP ADDRESS | device |
|---|---|
| 10.10.1.2/32 | L2-2 |
| 10.10.2.2/32 | L2-4 |
| 10.10.1.1/32 | L3-2 |
| 10.10.2.1/32 | L3-4 |

Fig. 9

| DESTINATION IP ADDRESS | DESTINATION MAC ADDRESS |
|---|---|
| 10.10.1.2 | ff-ff-ff-ff-ff-ff |
| 10.10.2.2 | ff-ff-ff-ff-ff-ff |

COMMUNICATION APPARATUS, COMMUNICATION SYSTEM, COMMUNICATION METHOD AND PROGRAM

CROSS-REFERENCE TO RELATED APPLICATIONS

This application is a National Stage application under 35 U.S.C. § 371 of International Application No. PCT/JP2020/004418, having an International Filing Date of Feb. 5, 2020. The disclosure of the prior application is considered part of the disclosure of this application, and is incorporated by reference in its entirety into this application.

TECHNICAL FIELD

The present invention relates to a technique for connecting an L3 tunnel and an L2 tunnel in a communication system.

BACKGROUND ART

In a VPN (Virtual Private Network) service or the like in a network, connection of an L3 (Layer 3) tunnel and an L2 (Layer 2) tunnel (e.g., a VXLAN: Non-Patent Literature 1) may be needed.

For connection of an L3 tunnel and an L2 tunnel, a router (hereinafter referred to as an intermediate router) which is capable of terminating both an L3 tunnel and an L2 tunnel is generally used, and the L3 tunnel and the L2 tunnel are connected via the intermediate router.

An IP packet which is transmitted from an opposite router connected to the intermediate router by the L3 tunnel arrives at the intermediate router via the L3 tunnel and is transmitted to an L2 apparatus (a switch, a server, or the like called here an L2 apparatus for convenience) which is connected to the intermediate router by the L2 tunnel.

To perform transmission from the intermediate router to the L2 apparatus, the intermediate router needs to know a MAC address (destination MAC address) of an interface for the L2 tunnel in the L2 apparatus.

If IP addresses are set for an interface for the L2 tunnel in the intermediate router and the interface for the L2 tunnel in the L2 apparatus, the intermediate router can acquire the destination MAC address by ARP (Address Resolution Protocol).

CITATION LIST

Non-Patent Literature

Non-Patent Literature 1: RFC 7348 "Virtual eXtensible Local Area Network (VXLAN): A Framework for Overlaying Virtualized Layer 2 Networks over Layer 3 Networks" https://tools.ietf.org/html/rfc7348

SUMMARY OF THE INVENTION

Technical Problem

To set an IP address for the interface for the L2 tunnel in the intermediate router, an IP address of a VPN service user needs to be provided from a service provider which provides a VPN service by an L2 tunnel, for example. However, in some cases, provision of an IP address may be impossible.

In such a case, the intermediate router is unable to resolve the destination MAC address by ARP and cannot transfer the IP packet received via the L3 tunnel to the L2 apparatus via the L2 tunnel. That is, the IP packet cannot be communicated.

The present invention has been made in view of the above-described point, and has as its object to provide a technique for allowing communication of an IP packet via an L2 tunnel without setting an IP address for an interface for the L2 tunnel in a communication apparatus which terminates an L3 tunnel and the L2 tunnel.

Means for Solving the Problem

According to the disclosed technique, there is provided a communication apparatus which terminates an L2 tunnel and an L3 tunnel, including
a table storage unit which stores an ARP table where a broadcast MAC address is set as a destination MAC address linked to a destination IP address, and
a transmission unit which acquires the broadcast MAC address as a destination MAC address corresponding to a destination IP address of an IP packet received via the L3 tunnel by referring to the ARP table and transmits a frame to which the broadcast MAC address is added as a destination MAC address, via the L2 tunnel.

Effects of the Invention

According to the disclosed technique, it is possible to communicate an IP packet via an L2 tunnel without setting an IP address for an interface for the L2 tunnel in a communication apparatus which terminates an L3 tunnel and the L2 tunnel.

DESCRIPTION OF EMBODIMENTS

An embodiment of the present invention (the present embodiment) will be described below with reference to the drawings. The embodiment to be described below are merely illustrative, and embodiments to which the present invention is applied are not limited to the embodiment below.

A technique for communicating an IP packet via the L2 tunnel without setting an IP address for an interface for the L2 tunnel in a communication apparatus which terminates both an L3 tunnel and an L2 tunnel will be described below in detail. Note that although an example which uses a router as a communication apparatus in question is illustrated below, the technique according to the present invention can also be applied to a communication apparatus other than a router.

(System Configuration)

Figure 1:
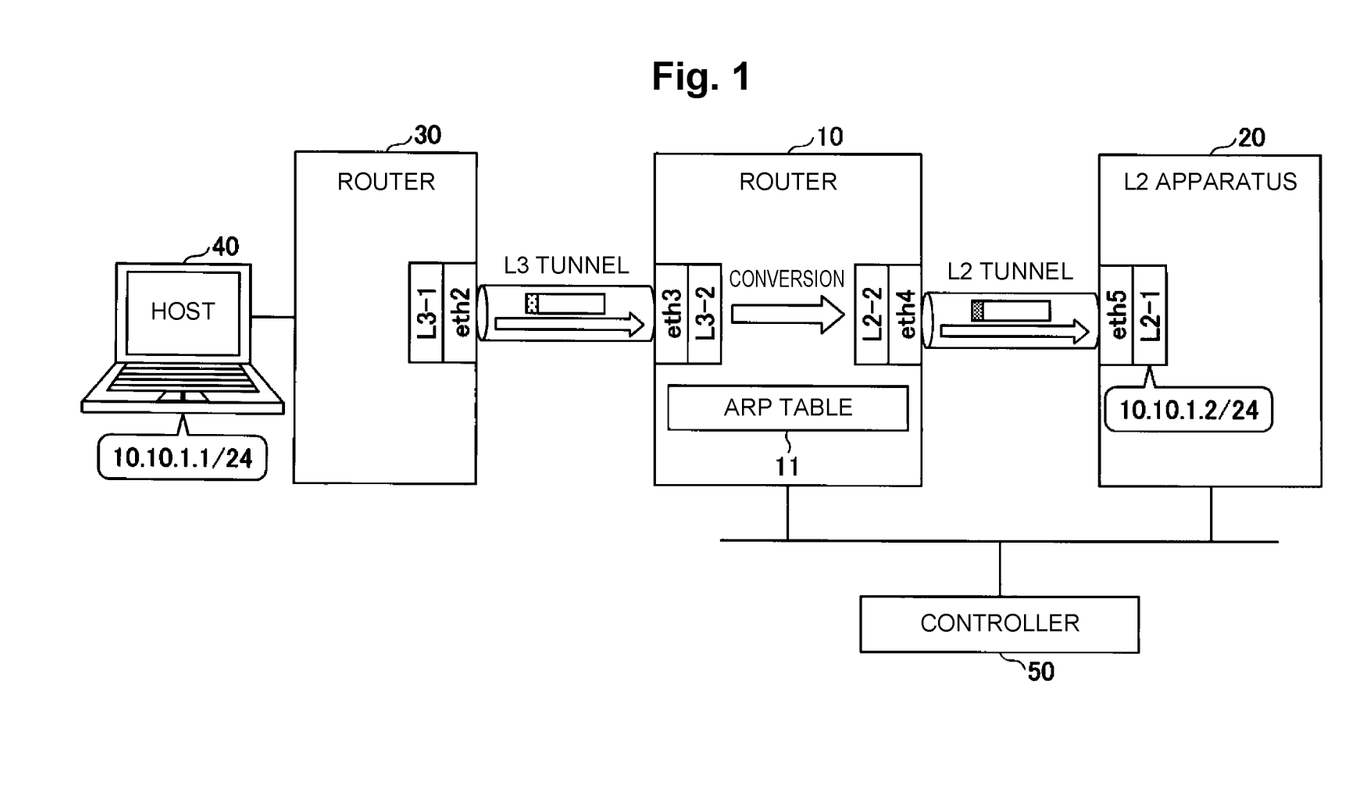
FIG. 1 is a configuration diagram of a communication system according to an embodiment of the present invention.

FIG. 1 shows an example of a configuration of a communication system according to the embodiment of the present invention. As shown in FIG. 1, the communication system according to the present embodiment has a router 10, an L2 apparatus 20, a router 30, a host 40, and a controller 50. The L2 apparatus 20 is a switch or a server which is capable of terminating an L2 tunnel.

The router 10, the L2 apparatus 20, the router 30, the host 40, and the controller 50 are all connected to a communication network. As shown in FIG. 1, an L3 tunnel is set between the router 30 and the router 10, and an L2 tunnel is set between the router 10 and the L2 apparatus 20.

As an interface which terminates the L3 tunnel in the router 30, L3-1 is shown. As an interface which terminates the L3 tunnel in the router 10, L3-2 is shown. As an interface which terminates the L2 tunnel in the router 10, L2-2 is shown. As an interface which terminates the L3 tunnel in the L2 apparatus 20, L2-1 is shown.

Note that, for example, the fact that an interface terminating the L2 tunnel in the router 10 is denoted as "eth4" and "L2-2" means that the logical interface L2-2 is set on a physical interface eth4. Note that the term "logical" may be interchanged with the term "software-based." The same applies to other interfaces shown in FIG. 1.

The controller 50 is an apparatus which is capable of making settings on the router 10 and settings on the L2 apparatus 20. The host 40 is an apparatus which communicates with the L2 apparatus 20.

In the example shown in FIG. 1, 10.10.1.2 is set as an IP address for the interface L2-1 of the L2 apparatus 20. In contrast, no IP address is set for the interface L2-2 of the router 10 in the example shown in FIG. 1. For example, a case where an IP address of a VPN service user is not desired to be used corresponds to the case.

Assume here that the host 40 transmits an IP packet to the L2 apparatus 20 (i.e., to 10.10.1.2).

The IP packet transmitted from the host 40 first arrives at the router 30 and is transmitted from the router 30 to the router 10 by the L3 tunnel.

The router 10 that has received the IP packet via the L3 tunnel does not have a destination MAC address required to deliver the IP packet to the L2 apparatus 20 through the L2 tunnel. For this reason, the idea of resolving the destination MAC address using ARP which is generally used to resolve a destination MAC address of an IP packet is conceivable. If ARP resolution is successful, a destination IP address and the destination MAC address are linked and recorded in an ARP table 11 of the router 10, and the router 10 can acquire the destination MAC address corresponding to the destination IP address by referring to the ARP table 11.

However, since no IP address is set for the interface L2-2 of the router 10 in the present embodiment, it is impossible to resolve the destination MAC address using ARP. In this state, the IP packet cannot be transmitted to the L2 apparatus 20 via the L2 tunnel. A configuration and operation for solving the problem will be described below in detail.

(Configuration and Setup of ARP Table)

Figure 2:
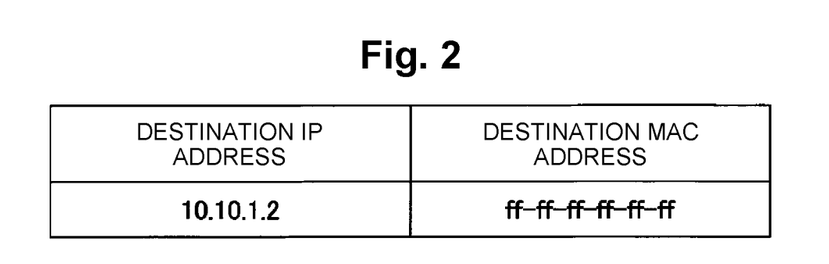
FIG. 2 is a chart showing an example of setup of an ARP table.

In order to implement L2-based communication even in a state as described above where ARP resolution is impossible and a destination MAC address is not acquirable, a broadcast MAC address (ff-ff-ff-ff-ff-ff) is set as a MAC address which is linked to a destination IP address in the ARP table 11 of the router 10 in the present embodiment. FIG. 2 shows an example of the ARP table with the broadcast MAC address set therein.

A frame (or more specifically, an Ethernet® frame) in which the broadcast MAC address is set as a destination MAC address is received by all Ethernet® interfaces on the same network. However, since an Ethernet® frame (having an IP packet in a payload) is transmitted through an L2 tunnel in the present embodiment, only an interface terminating an L2 tunnel receives an Ethernet® frame. That is, since a frame given the broadcast MAC address passes only through an L2 tunnel, communication is possible without affecting an interface other than an interface for an L2 tunnel.

Note that use of the broadcast MAC address as a MAC address linked to a destination IP address is an example.

The controller 50 shown in FIG. 1 performs setup of the L2 tunnel between the router 10 and the L2 apparatus 20 and setup of the ARP table in the router 10.

(Example of Operation of Communication System)

Figure 3:
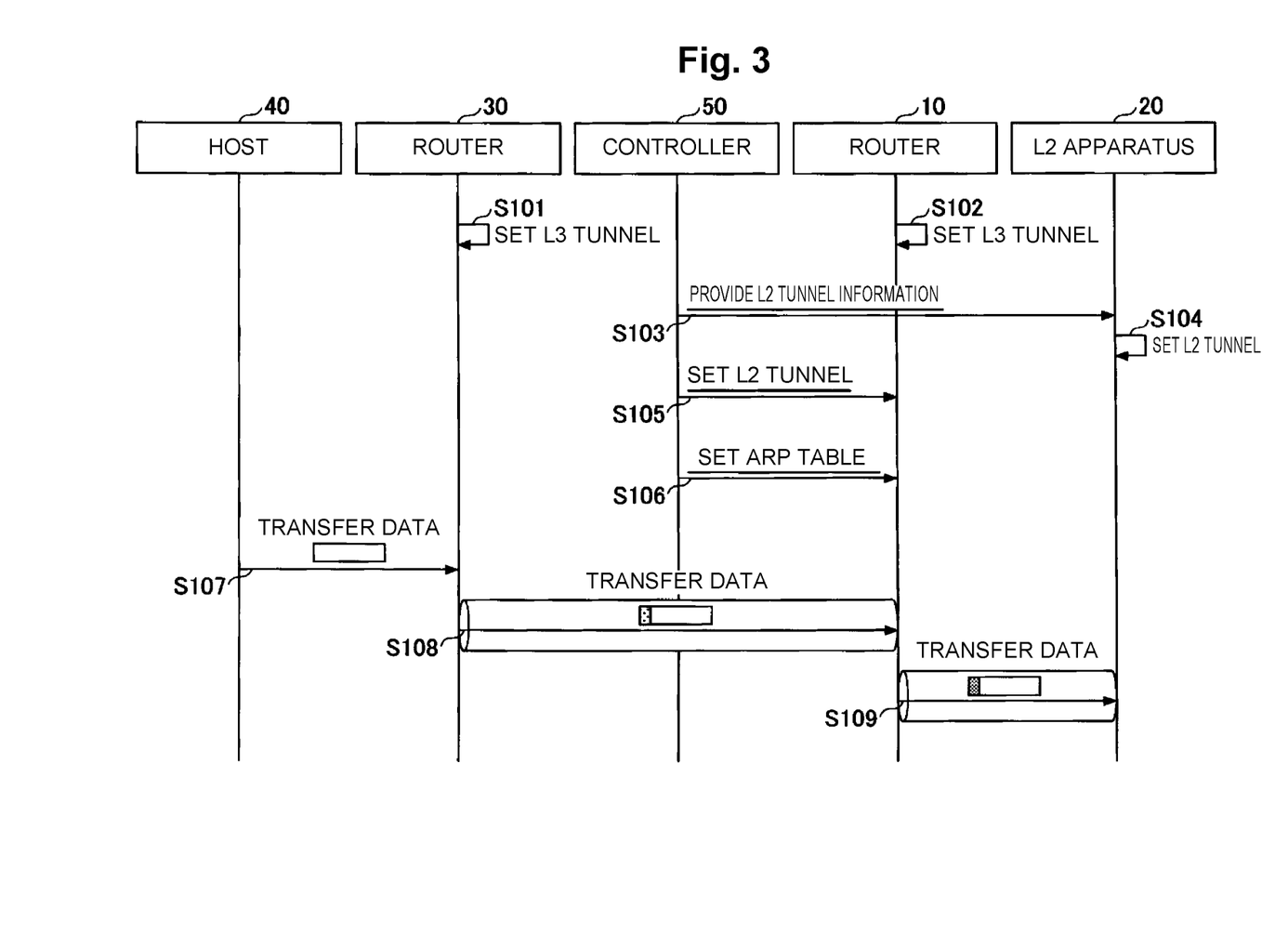
FIG. 3 is a sequence chart showing an example of operation of the communication system.

An example of operation of the communication system according to the present embodiment will be described with reference to a sequence chart shown in FIG. 3.

First, in S101 and S102, L3 tunnel setup in the router 30 and L3 tunnel setup in the router 10 are executed.

In S103, the controller 50 provides L2 tunnel information to the L2 apparatus 20, and the L2 apparatus 20 executes L2 tunnel setup. The L2 tunnel information that the controller 50 provides to the L2 apparatus 20 includes the IP address (10.10.1.2) of L2-1 in addition to information of an L2 tunnel header and the like.

The controller 50 executes L2 tunnel setup for the router 10 in S105 and executes ARP table setup in S106.

The L2 tunnel setup in S105 refers to setting an interface (e.g., L2-2) for the L2 tunnel on an Ethernet® interface (e.g., eth4).

In the ARP table setup in S106, the broadcast MAC address is set as a MAC address corresponding to the IP address (10.10.1.2) of L2-1 provided to the L2 apparatus 20. With this setup, the ARP table 11 is set as shown in FIG. 2.

In S107, an IP packet is transmitted from the host 40. The router 30 receives the IP packet. In S108, the router 30 transmits the IP packet to the router 10 via the L3 interfaces.

The router 10 acquires the broadcast MAC address as the MAC address corresponding to the destination IP address (10.10.1.2) by searching the ARP table 11 by the destination IP address (10.10.1.2) of the IP packet received from the L3 tunnel. The router 10 then generates an Ethernet® frame which has the IP packet in a payload and has the broadcast MAC address as a destination MAC address.

The router 10 generates a frame for the L2 tunnel to be transmitted by adding an L2 tunnel header to the Ethernet® frame and transmits the frame from the interface L2-2 (S109).

Figure 4:
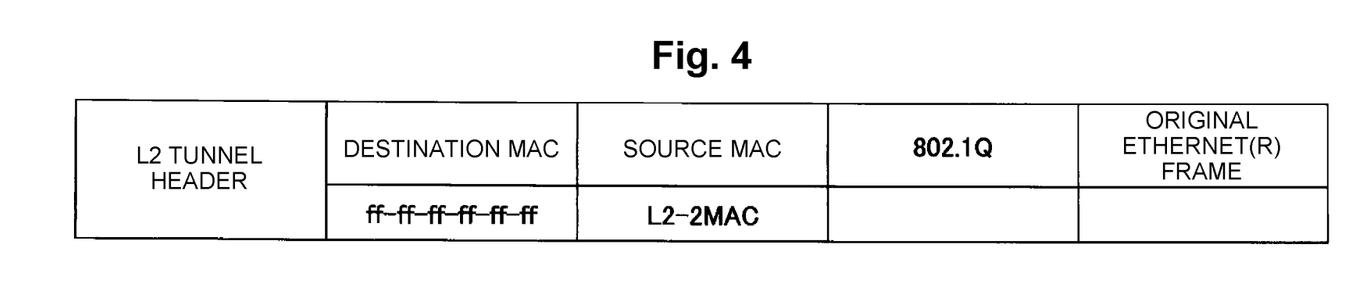
FIG. 4 is a chart showing an example of a packet to be transferred.

The L2 apparatus 20 receives the frame, removes the L2 tunnel header, and extracts the Ethernet® frame. Since the destination MAC address of the Ethernet® frame is the broadcast MAC address, the L2 apparatus 20 receives the Ethernet® frame. The L2 apparatus 20 extracts data in the IP packet in the Ethernet® frame and performs processing. FIG. 4 shows an example of the frame transmitted from the router 10 to the L2 apparatus 20 in S109.

Setting the broadcast MAC address as a MAC address corresponding to a destination IP address in the ARP table 11 as described above allows transfer of data without setting an IP address for the L2 tunnel interface of the router 10. That is, protocol conversion from the L3 tunnel to the L2 tunnel is possible without assigning an IP address to the L2 tunnel interface of the router 10.

For the above-described reason, for example, a service provider which provides a VPN service using the router 10 as a relay router is allowed not to use an IP address of a VPN service user.

(Protocol Conversion from L2 Tunnel to L3 Tunnel)

Figure 5:
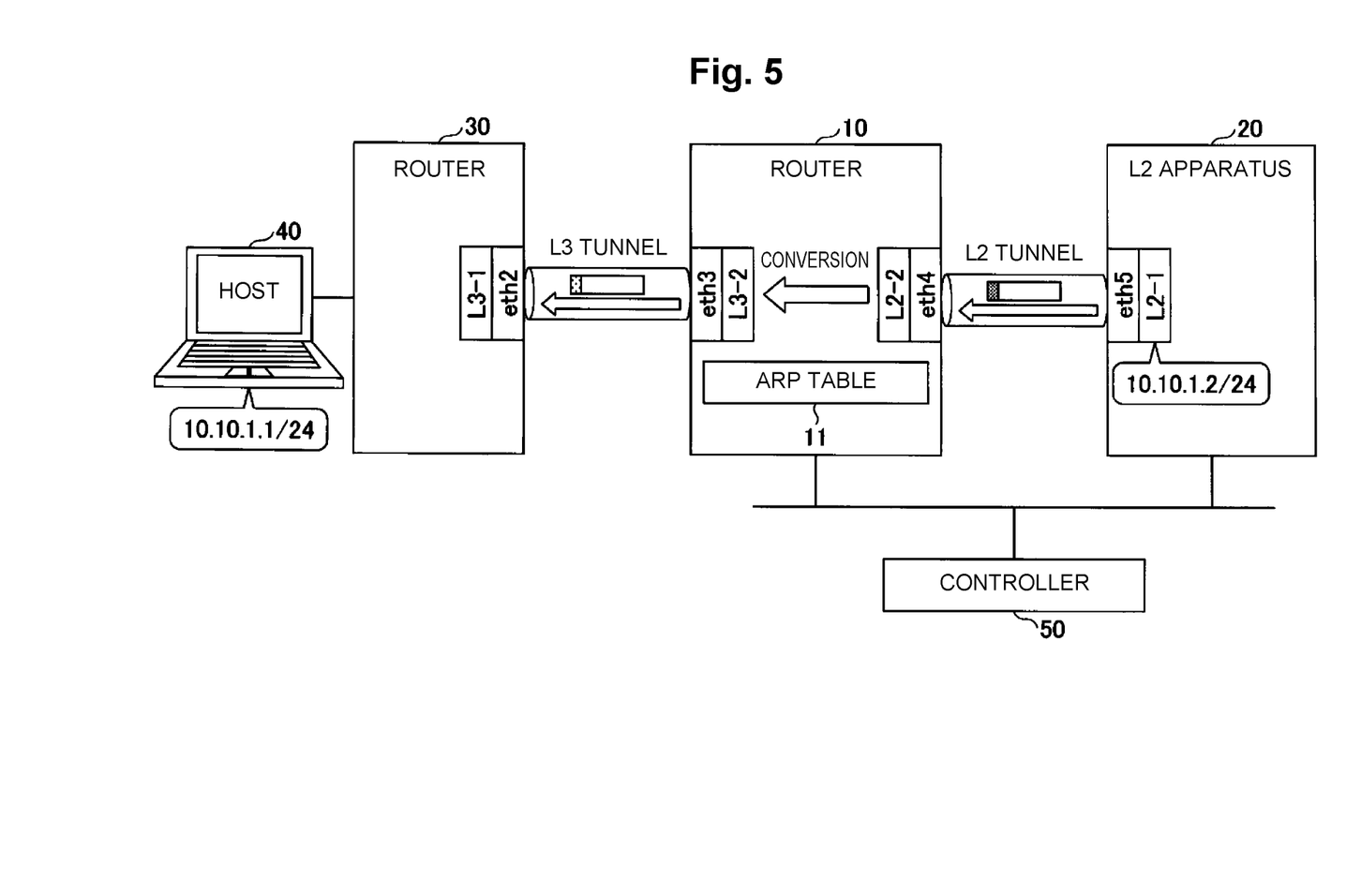
FIG. 5 is a diagram showing communication from an apparatus 20 to a host 40.

Communication from the L2 apparatus 20 to the host 40 as shown in FIG. 5, i.e., protocol conversion from the L2 tunnel to the L3 tunnel does not require assignment of an IP address to the L2 tunnel interface of the router 10 and can be executed by using proxy ARP that is an existing technology.

Figure 6:
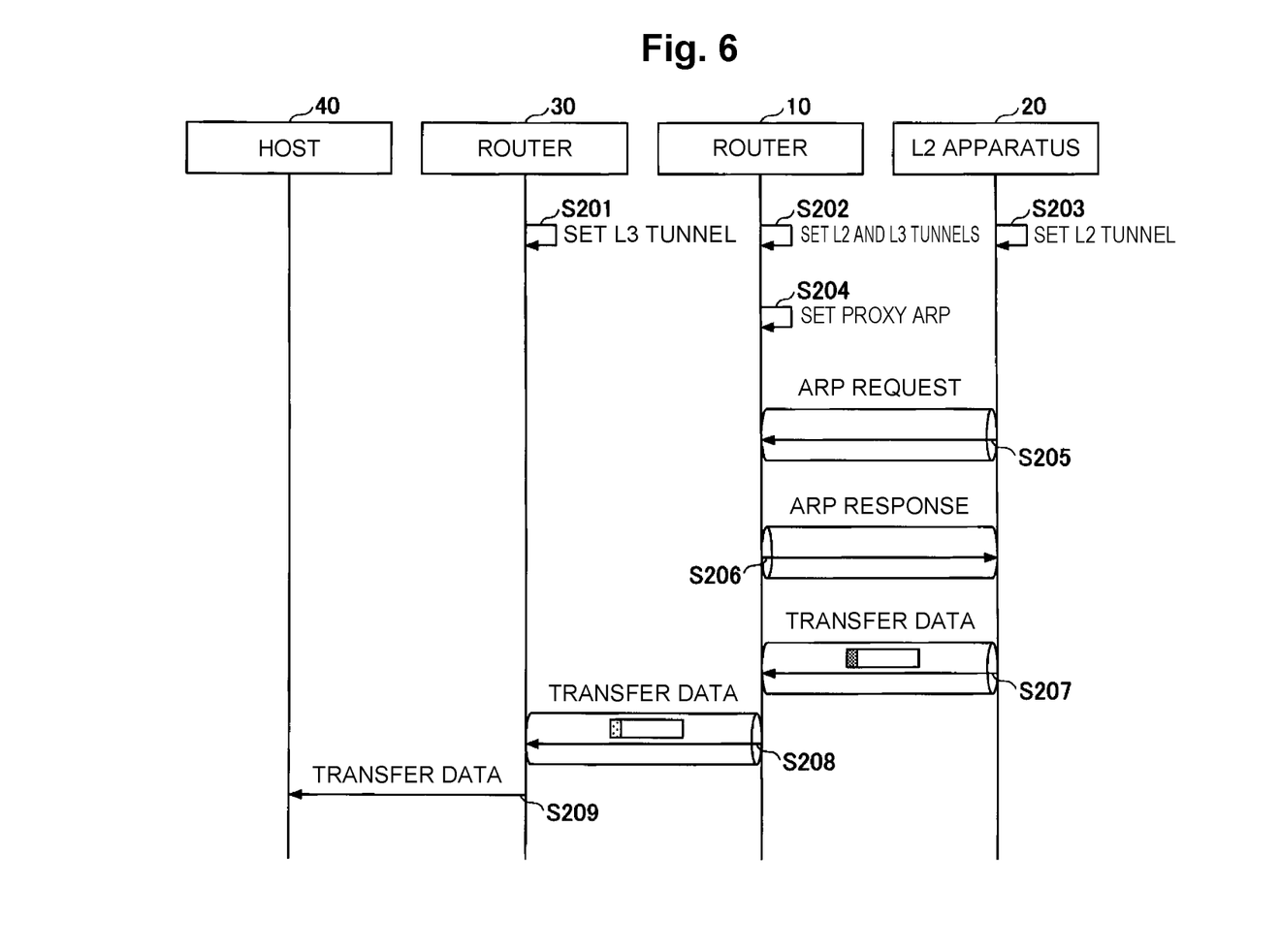
FIG. 6 is a sequence chart of the communication from the apparatus 20 to the host 40.

An example of operation in a case where data is transmitted from the L2 apparatus 20 toward the host 40 will be described with reference to FIG. 6.

In S203, S202, and S203, setup of the L2 tunnel and the L3 tunnel is performed. In the router 10, setup of proxy ARP is performed. In S205, the L2 apparatus 20 transmits an ARP request for checking a MAC address corresponding to an IP address (10.10.1.1) of the host 40.

The router 10 can make IP communication with the host 40. The router 10 uses proxy ARP to return an ARP response to the L2 apparatus 20 as proxy for the host 40 in S206.

The L2 apparatus 20 transmits an IP packet via a tunnel, and the IP packet arrives at the router 30 and is transferred from the router 30 to the host 40 (S207 to S209).

(Case where there are Plurality of Tunnels)

The technique described with reference to FIG. 1 and the like can also be applied to a case where there is a plurality of L2 tunnels. That is, if a plurality of L2 tunnels is built, communication is made possible by making settings on the ARP table 11 corresponding to the number of L2 tunnels.

Association between an L3 tunnel and an L2 tunnel is made possible by setting a routing table 12 in the router 10. Even in a case where no IP address is assigned to an L2 tunnel interface, the L2 tunnel interface can be designated by an interface name.

Settings on the ARP table 11 and settings on the routing table 12 can be made from the controller 50.

Figure 7:
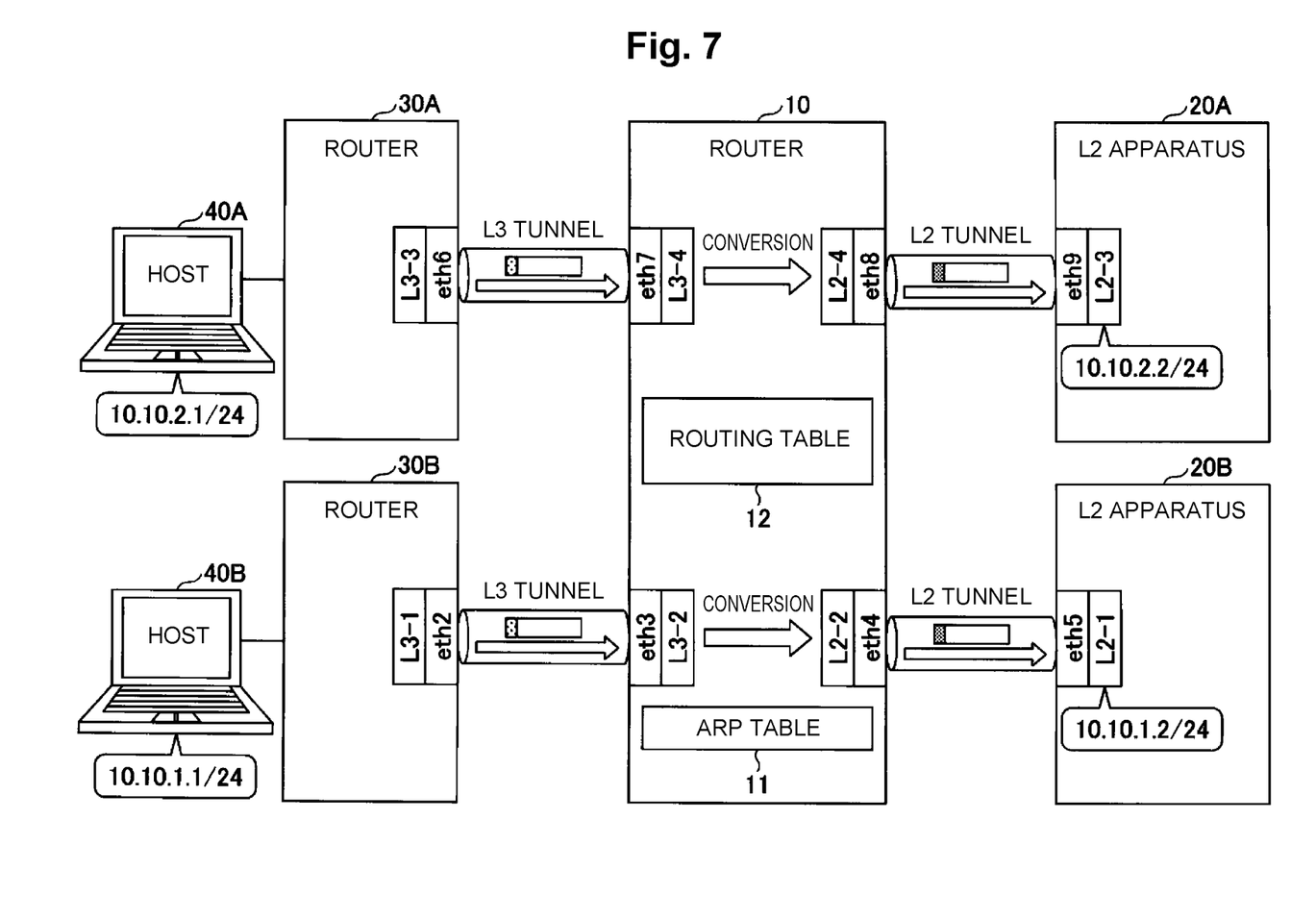
FIG. 7 is a configuration diagram of a communication system in a case where there is a plurality of tunnels.

FIG. 7 shows an example of a system configuration in a case where two L3 tunnels and two L2 tunnels are built.

In the example in FIG. 7, a router 30A which is connected to a host 40A and a router 30B which is connected to a host 40B are connected to the router 10 by the respective L3 tunnels. An L2 apparatus 20A and an L2 apparatus 20B are connected to the router 10 by the respective L2 tunnels.

Figure 8:
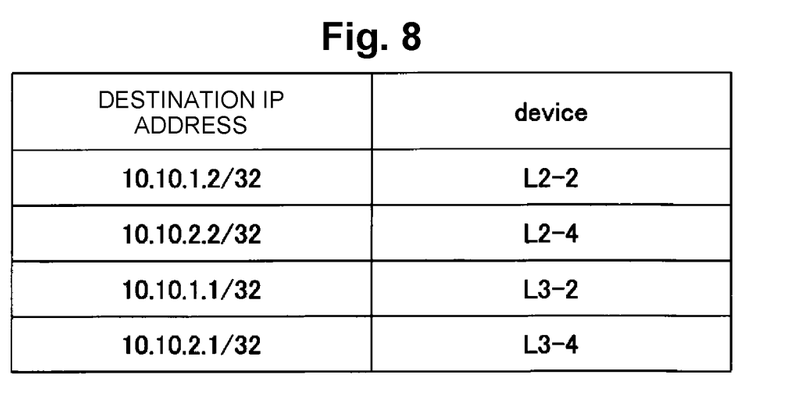
FIG. 8 is a chart showing an example of setup of a routing table.

As shown in FIG. 8, a destination IP address and a forwarding destination interface name are associated and stored in the routing table 12 that the router 10 holds.

Figure 9:
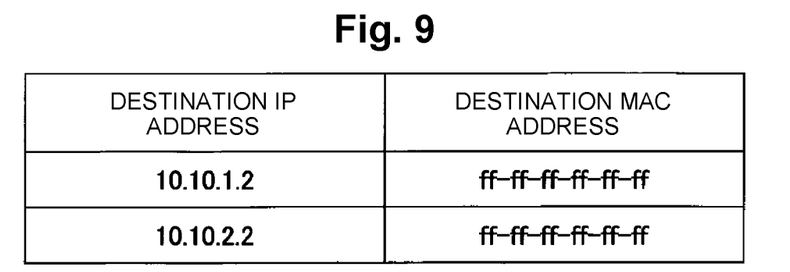
FIG. 9 is a chart showing an example of setup of the ARP table.

As shown in FIG. 9, the broadcast MAC address is set as each of a MAC address corresponding to an IP address of L2-1 and a MAC address corresponding to an IP address of L2-3 in the ARP table 11. As described above, entries corresponding in number to the L2 tunnels are made.

For example, assume that an IP packet is transmitted from the host 40A to the L2 apparatus 20B (with a destination IP address of 10.10.1.2). In this case, the router 10 that has received the IP packet forwards the IP packet from an interface L3-4 to an interface L2-2 by referring to the routing table 12 (FIG. 8) that the router 10 holds. The router 10 also generates an L2 tunnel frame having an Ethernet® frame which has the broadcast MAC address as a destination MAC address by referring to the ARP table 11 and transmits the L2 tunnel frame from L2-2.

(Apparatus Configuration)

Figure 10:
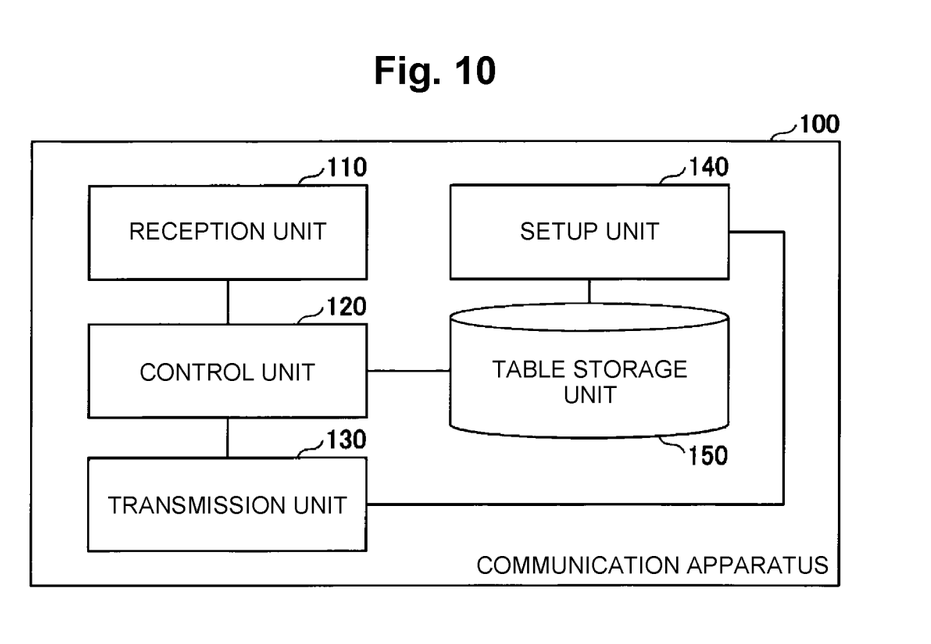
FIG. 10 is a diagram showing an example of a functional configuration of a communication apparatus.

FIG. 10 shows an example of a configuration of a communication apparatus 100 corresponding to the router 10 according to the present embodiment.

The communication apparatus 100 has a reception unit 110, a control unit 120, a transmission unit 130, a setup unit 140, and a table storage unit 150. Note that the example shown in FIG. 10 assumes that the reception unit 110 terminates an L3 tunnel and that the transmission unit 130 terminates an L2 tunnel.

An ARP table corresponding to the ARP table 11 described earlier and a routing table corresponding to the routing table 12 are stored in the table storage unit 150.

The reception unit 110 has one or more interfaces and receives a packet (which may be called data). The control unit 120 generates a frame which has the broadcast MAC address as a destination MAC address by referring to the ARP table and forwards the frame to an interface in the transmission unit 130 which corresponds to a destination of the packet by referring to the routing table. The transmission unit 130 transmits the frame from the interface.

Note that the transmission unit 130 may include a function of the control unit 120. That is, the transmission unit 130 may generate a frame having the broadcast MAC address as a destination MAC address by referring to the ARP table and transmit the frame from an interface in the transmission unit 130 which corresponds to a destination of a packet by referring to the routing table.

The setup unit 140 receives setup information (e.g., header information and a parameter) for the L2 tunnel from the controller 50 and sets an interface for the L2 tunnel in the transmission unit 130 on the basis of the setup information. The setup unit 140 also receives setup information for the ARP table and setup information for the routing table from the controller 50 and stores the pieces of information in the table storage unit 150.

Figure 11:
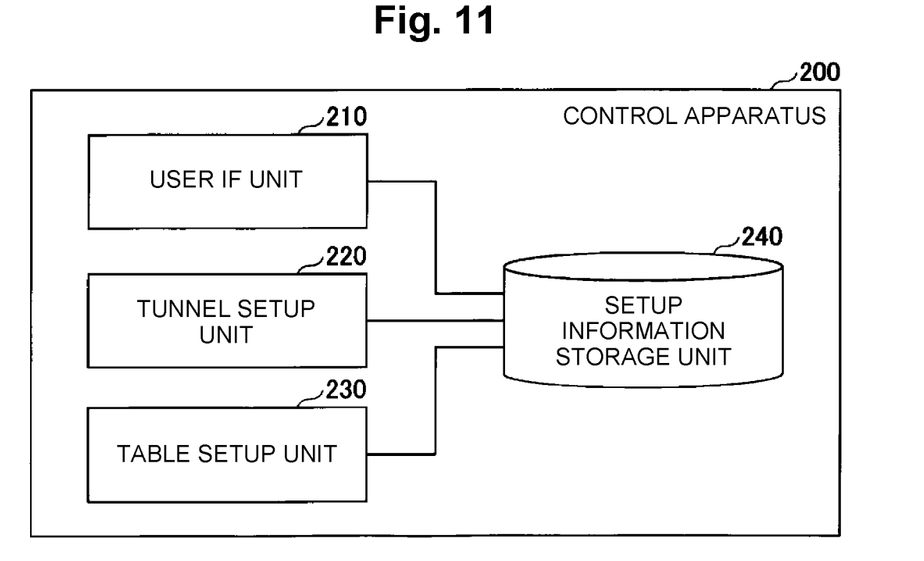
FIG. 11 is a diagram showing an example of a functional configuration of a control apparatus.

FIG. 11 shows an example of a configuration of a control apparatus 200 corresponding to the controller 50. As shown in FIG. 11, the control apparatus 200 includes a user IF unit 210, a tunnel setup unit 220, a table setup unit 230, and a setup information storage unit 240.

The user IF unit 210 displays a setup screen on a terminal of a user and stores setup information input from the setup screen in the setup information storage unit 240.

The tunnel setup unit 220 reads out setup information for an L2 tunnel from the setup information storage unit 240 and transmits the setup information for an L2 tunnel to the communication apparatus 100, thereby setting an L2 tunnel. The table setup unit 230 reads out pieces of setup information for an ARP table and a routing table from the setup information storage unit 240 and transmits the pieces of setup information for an ARP table and a routing table to the communication apparatus 100, thereby setting an ARP table and a routing table.

Example of Hardware Configuration

The communication apparatus 100 and the control apparatus 200 can be both implemented by, for example, causing a computer to execute a program. The computer may be a physical computer or a virtual machine. The "computer" may be composed of a CPU, a memory, and the like which are included in a router, a switch, or the like.

That is, an apparatus in question (the communication apparatus 100 or the control apparatus 200) can be implemented by executing a program corresponding to processing to be performed by the apparatus using hardware resources, such as the CPU and the memory, built into the computer. The program can be recorded on a computer-readable recording medium (e.g., a portable memory), saved, and distributed. The program can also be provided through a network, such as the Internet or e-mail.

Figure 12:
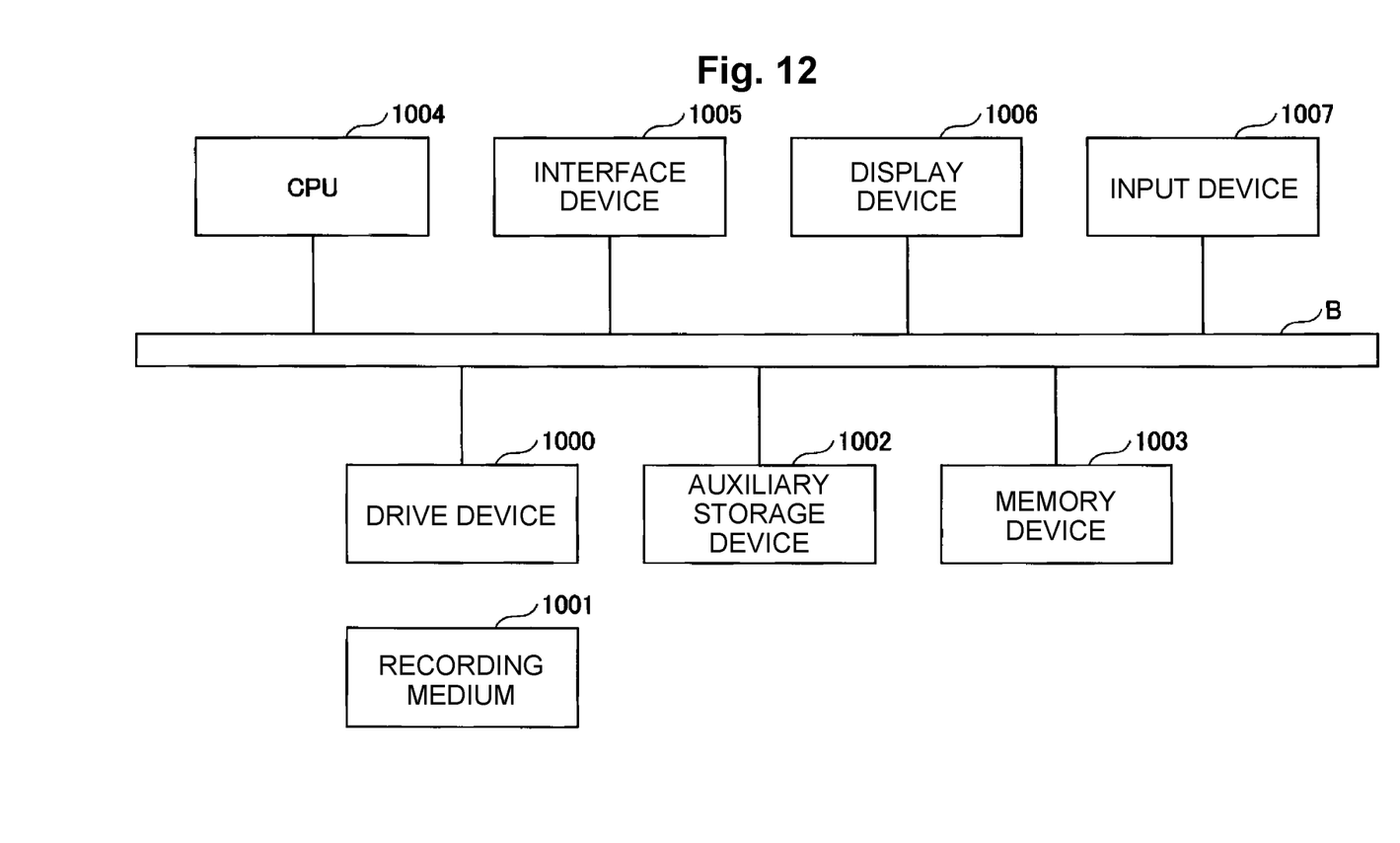
FIG. 12 is a diagram showing an example of a hardware configuration of an apparatus.

FIG. 12 is a diagram showing an example of a hardware configuration of the above-described computer. The computer in FIG. 12 has a drive device 1000, an auxiliary storage device 1002, a memory device 1003, a CPU 1004, an interface device 1005, a display device 1006, an input device 1007, and the like which are interconnected by a bus B.

The program that implements processing in the computer is provided by a recording medium 1001, such as a CD-ROM or a memory card. When the recording medium 1001 storing the program is set in the drive device 1000, the program is installed from the recording medium 1001 into the auxiliary storage device 1002 via the drive device 1000. Note that the installment of the program need not be performed from the recording medium 1001 and that the program may be downloaded from another computer via a network. The auxiliary storage device 1002 stores the installed program and also stores files, data, and the like which are necessary.

The memory device 1003 reads out the program from the auxiliary storage device 1002 and stores the program if there is an instruction to run the program. The CPU 1004 implements functions of the apparatus in accordance with the program stored in the memory device 1003. The interface device 1005 is used as an interface for connection to a network and functions as input means and output means via the network. The display device 1006 displays a GUI (Graphical User Interface) or the like based on the program. An input device 157 is composed of a keyboard, a mouse, a button, a touch panel, or the like and is used to enter various operation instructions.

Summary of Embodiment

The present specification discloses at least communication apparatuses, a communication system, a communication method, and a program in the following items.

(First Item)

A communication apparatus which terminates an L2 tunnel and an L3 tunnel, including
    a table storage unit which stores an ARP table where a broadcast MAC address is set as a destination MAC address linked to a destination IP address, and
    a transmission unit which acquires the broadcast MAC address as a destination MAC address corresponding to a destination IP address of an IP packet received via the L3 tunnel by referring to the ARP table and transmits a frame to which the broadcast MAC address is added as a destination MAC address, via the L2 tunnel.

(Second Item)

The communication apparatus according to the first item, in which
    the table storage unit further includes a routing table which holds an interface name linked to a destination IP address, and
    the transmission unit transmits the frame from an interface linked to the destination IP address by referring to the routing table.

(Third Item)

A control apparatus which executes setup of the L2 tunnel and setup of the ARP table for a communication apparatus according to the first item or the second item.

(Fourth Item)

The control apparatus according to the third item, in which the control apparatus sets, in the ARP table, a broadcast MAC address as a MAC address corresponding to an IP address set for an interface of an opposite apparatus which is connected to the communication apparatus by the L2 tunnel.

(Fifth Item)

A communication system including the communication apparatus according to the first item or the second item and the control apparatus according to the third item or the fourth item.

(Sixth Item)

A communication method to be executed by a communication apparatus which terminates an L2 tunnel and an L3 tunnel, in which the communication apparatus
    includes a table storage unit which stores an ARP table where a broadcast MAC address is set as a destination MAC address linked to a destination IP address, and
    acquires the broadcast MAC address as a destination MAC address corresponding to a destination IP address of an IP packet received via the L3 tunnel by referring to the ARP table and transmits a frame to which the broadcast MAC address is added as a destination MAC address, via the L2 tunnel.

(Seventh Item)

A program for causing a computer to function as the units in a communication apparatus according to the first item or the second item.

The present embodiment has been described above. The present invention is not limited to such a particular embodiment, and various modifications and changes can be made within the scope of the gist of the present invention described in the claims.

REFERENCE SIGNS LIST 10, 30 Router
20 L2 apparatus
40 Host
50 Controller
100 Communication apparatus
110 Reception unit
120 Control unit
130 Transmission unit
140 Setup unit
150 Table storage unit
200 Control apparatus
210 User IF unit
220 Tunnel setup unit
230 Table setup unit
240 Setup information storage unit
1000 Drive device
1001 Recording medium
1002 Auxiliary storage device
1003 Memory device
1004 CPU
1005 Interface device
1006 Display device
1007 Input device

The invention claimed is:

1. A communication apparatus for terminating an L2 tunnel and an L3 tunnel, the communication apparatus comprising:
a first interface component configured to interface with the L3 tunnel;
a transmission unit comprising a second interface component that is configured to interface with the L2 tunnel, wherein the second interface component is not assigned an IP address; and
a table storage unit, including one or more processors, configured to store an ARP table where a broadcast MAC address with every bit assigned to 1 is stored as a destination MAC address in association with a destination IP address for an L2 apparatus which is connected to the communication apparatus by the L2 tunnel; wherein
the transmission unit is configured to (i) acquire the broadcast MAC address as a destination MAC address corresponding to a destination IP address of an IP packet received via the L3 tunnel by referring to the ARP table and (ii) transmit a frame to which the broadcast MAC address is added as a destination MAC address, via the L2 tunnel.

2. The communication apparatus according to claim 1, wherein
the table storage unit is further configured to store a routing table which holds an interface name linked to a destination IP address, and
the transmission unit is configured to transmit the frame from an interface linked to the destination IP address by referring to the routing table.

3. A control apparatus including one or more processors configured to execute setup of the L2 tunnel and setup of the ARP table for the communication apparatus according to claim 1.

4. The control apparatus according to claim 3, wherein the control apparatus is configured to set, in the ARP table, the broadcast MAC address as a MAC address corresponding to an IP address set for an interface of an opposite apparatus which is connected to the communication apparatus by the L2 tunnel.

5. A communication system comprising the communication apparatus according to claim 1 and the control apparatus according to claim 3.

6. A communication method executed by a communication apparatus for terminating an L2 tunnel and an L3 tunnel, wherein the communication apparatus comprises (i) a first interface component configured to interface with the L3 tunnel and (ii) a transmission unit comprising a second interface component that is configured to interface with the L2 tunnel, wherein the second interface component is not assigned an IP address, wherein the communication method comprising:
storing, by a table storage unit of the communication apparatus, an ARP table where a broadcast MAC address with every bit assigned to 1 is stored as a destination MAC address in association with a destination IP address for an L2 apparatus which is connected to the communication apparatus by the L2 tunnel, and
acquiring the broadcast MAC address as a destination MAC address corresponding to a destination IP address of an IP packet received via the L3 tunnel by referring to the ARP table and transmitting a frame to which the broadcast MAC address is added as a destination MAC address, via the L2 tunnel.

7. A non-transitory computer-readable medium storing a program for causing a computer to perform operations of a communication apparatus for terminating an L2 and an L3 tunnel, wherein the communication apparatus comprises (i) a first interface component configured to interface with the L3 tunnel and (ii) a transmission unit comprising a second interface component that is configured to interface with the L2 tunnel, wherein the second interface component is not assigned an IP address, the operations comprising:
storing an ARP table where a broadcast MAC address with every bit assigned to 1 is stored as a destination MAC address in association with a destination IP address for an L2 apparatus which is connected to the communication apparatus by the L2 tunnel, and
acquiring the broadcast MAC address as a destination MAC address corresponding to a destination IP address of an IP packet received via the L3 tunnel by referring to the ARP table and transmitting a frame to which the broadcast MAC address is added as a destination MAC address, via the L2 tunnel.

8. The communication method according to claim 6, further comprising:
storing, by the table storage unit, a routing table which holds an interface name linked to a destination IP address, and
transmitting the frame from an interface linked to the destination IP address by referring to the routing table.

9. The non-transitory computer-readable medium according to claim 7, wherein the operations further comprise:
storing a routing table which holds an interface name linked to a destination IP address, and
transmitting the frame from an interface linked to the destination IP address by referring to the routing table.

* * * * *